United States Patent [19]

Renzelmann

[11] Patent Number: 4,483,423
[45] Date of Patent: Nov. 20, 1984

[54] TORQUE ISOLATION DEVICE

[75] Inventor: Michael E. Renzelmann, Woodinville, Wash.

[73] Assignee: The Boeing Company, Seattle, Wash.

[21] Appl. No.: 420,727

[22] Filed: Sep. 21, 1982

[51] Int. Cl.³ ............................................. F16D 67/00
[52] U.S. Cl. .................................................... 188/134
[58] Field of Search ............. 188/82.2, 82.8, 134–136, 188/184, 185, 189; 192/7, 8 R

[56] References Cited

U.S. PATENT DOCUMENTS

| 1,170,216 | 2/1916 | Blanch | 188/134 X |
| 2,651,388 | 9/1953 | Trowbridge et al. | 188/184 |
| 2,718,286 | 9/1955 | Clark | 188/134 |
| 3,688,881 | 9/1972 | Kinney | 188/134 X |

Primary Examiner—Duane A. Reger
Attorney, Agent, or Firm—Hughes, Barnard & Cassidy

[57] ABSTRACT

A torque isolation device for a force-sensitive load having a safe force limit to be imposed thereon, configured to transmit upstream rotational force within the limit to the load and transmit any force in excess thereof to a load-isolated path, is comprised of a radially displaceable driving coupling which includes a cam member having a dwell and bi-directional, outwardly oriented camming surfaces bounding same receiving a cam follower secured to a pivotal drive arm radially extensible from a biased primary transmission position, wherein the cam follower is disposed within the dwell, to an extended overload position in engagement with mechanical ground wherein the cam follower is displaced along the camming surface.

10 Claims, 2 Drawing Figures

TORQUE ISOLATION DEVICE

DESCRIPTION

1. Technical Field

The present invention relates generally to torque isolation devices and, more especially, to torque limiting devices of the type which will transmit rotational forces along a primary transmission path to a load until a preselected threshold value is reached, whereupon forces in excess of that threshold are coupled during overload conditions to a secondary transmission path isolated from the load to protect it against damage. The torque isolation device of the present invention may be operated in either of a self-energizing or non-self-energizing mode, and is therefore widely adaptable for myriad applications where a load is to be protected or effectively isolated from the imposition of excessive torque. A principal application of the torque isolation device of the present invention is in the context of nose wheel steering assemblies for large aircraft.

2. Background Art

All manner and variety of torque isolation or torque limiting devices have been proposed for the protection of an equally wide range of rotary devices. Machinery destined for diverse utilities, e.g., from metal-working machines to calculators, have been designed with an eye toward preventing damage in the event an input torque is applied in excess of the failure limits of load components. Such torque isolation devices are not only important in most such applications, in many they are crucial—particularly where the overall assembly is one having a high mechanical advantage. This is particularly true as respects various systems in aircraft; as it is desirable to provide sensitive control over sometimes considerable loads while nonetheless using lightweight structural components for overall system efficiency.

Somewhat exemplary of a torque limiting device employed in aircraft is that disclosed in U.S. Pat. No. 4,030,578, assigned to the assignee of the present invention. The device described there is one which prevents the transmission of torque from a drive source to a torque-responsive element when a predetermined limit has been reached. The device utilizes plural axial members each including a multiplicity of balls for torque transmission, wherein the balls are engaged within precisely shaped sockets defined in each axial member. Upon the application of an excessive torque (i.e., one exceeding a threshold determined to be safe for the load), the balls cause axial displacement of one member relative to the other and the concomitant engagement of a plurality of discs. The latter, upon such engagement, effectively prevent torque transmission. While the torque limiter disclosed and claimed in that patent is a very effective one, it must be rearmed after the jamming load has disappeared in order to resume normal operation. For example, the input must be relaxed for the limiter to be reset to the operating configuration.

Another type of protection device is disclosed in U.S. Pat. No. 2,580,298; there in the nature of an automatic stop for a calculating machine. Again the objective is to protect a sensitive part from being overdriven and perhaps damaged due to, e.g., jamming. The transmission includes, inter alia, a star wheel engaging pawl members. In the event a power-driven part is prevented from operating, or otherwise becomes locked, the pawls will yield and rock outwardly from the star wheel. During that movement, the pawls engage a shoe on the arm of a bail, the latter of which is pivoted on a tie rod. The bail also includes an arm which effectively engages a switch thereby de-energizing the power source. This approach is common, at least in a conceptual sense, to that further disclosed in U.S. Pat. No. 2,753,029.

Other load-limiting devices are the subjects of U.S. Pat. Nos. 1,745,738, 2,003,115, 2,172,834 and 4,175,484. While the apparatus disclosed therein are designed for utilities in widely disparate applications, each includes some type of disconnect mechanism, usually including a ratchet and pawl assembly, as an overload guard. U.S. Pat. Nos. 1,548,427 and No. 2,425,736 are also noteworthy within this context. In the '427 approach, relative rotational movement in excess of a predetermined amount results in a disconnection of the input from the output and a locking of the system by means of a pawl. In the '736 approach, a biased cam/cam follower (i.e., roller) operates to effectuate force disengagement by disconnection.

While there has been considerable activity in the design of devies within the aforesaid class, a common drawback includes the complete interruption of force transmission upon the occurrence of excess loading. In turn, some type fo manual reset or other manipulation of either load or drive is necessary to reestablish the normal transmission configuration. Thus, in the event the jamming of the load is one which arises either sporadically or which tends to dissipate over time, there arises a certain amount of inconvenience by virtue of the complete disruption in transmission. In those situations, it would be more desirable were the device to respond for torque isolation as required, but only for so long as so required; with an automatic return to the normal operating configuration one the jamming (and, hence, need for protection) subsides.

SUMMARY OF THE INVENTION

The present invention advantageously provides a torque isolation device which simply yet highly efficiently protects the load against the application of excessive torque. The present invention is particularly desirable for its ability to operate in a mode which permits the application of torque to the load up to a limiting value and then couples any excess to a secondary load path independent of the principal path during overload conditions. This leads to the further advantage of permitting the application of safe torque to the load irrespective of the presence of excessive torque, whereby control over the load may be maintained under even extreme operating conditions. The device of the present invention is further desirable for its ability to operate in a non-self-energizing mode, whereby a normal operational configuration is established upon dissipation of the jamming force or other cause of excessive torque. A further advantage of the precise structure of the torque isolation device of the present invention is its easy adaptability to a self-energizing mode should that be a desirable goal.

The foregoing and other advantages of the present invention are realized in a torque isolation device configured to transmit an upstream rotational force to a downstream load for force values less than or equal to a threshold or limit value and then to couple force in excess of that threshold to a load-isolated path during overload condition; which device comprises a radially displaceable driving coupling including cam means having an outwardly oriented cam surface engaging cam follower means secured to pivotal arm means extensible from a biased, primary transmission position with the cam follower in a dwell in the cam surface to an extended secondary transmission position with the cam followers displaced along the cam surfaces against the biasing force on those arms and in engagement with a mechanical ground constituting the load-isolated path. In the most preferred configuration, the cam members are disposed on the output side of the device and it operates in a non-self-energizing mode. However, the cam members may be disposed on the input side of the device and, to the extent desirable, the device may operate in a self-energizing mode. In either case, however, the drive and load are linked for force transmission up to the preestablished threshold, after which any excess is routed mechanically away from the load so that it does not experience the potentially damaging excess. When operating in the most preferred, non-self-energizing mode, dissipation of the cause for forces in excess of the limiting value results in the reestablishment of the normal operating configuration until and unless those causes or another giving rise to a force in excess of the limiting value reappear.

A highly preferred structural embodiment of the torque isolation device of the present invention is comprised of input and output shaft members disposed for semi-independent, relative rotational displacement with respect to one another; first and second drive arms secured for rotation with the input shaft, each of which is pivotal about a fixed point at a first end thereof from the biased, primary transmission position to a radially extended overload position during which the free ends of the drive arms move along a radially arcuate path; cam members secured for rotation with the output shaft, including radially outwardly directed camming surfaces having a dwell position corresponding to the primary transmission position; cam followers secured to each of the drive arms for driving engagement with the cam members; and biasing means securing the free ends of the drive arms for urging those arms into the primary transmission position with a predetermined biasing force correlated to the limiting torque to be transmitted to the output shaft. Thus, mechanical engagement between input and output is coupled across the cam/cam follower arrangement; the engagement of which is maintained at a predetermined force level dictated by the constrictive biasing force in combination with the cam geometry. Whenever excess force over the limiting value is effectively experienced on the output, the cam followers are cammed outwardly along the cam surfaces causing radial displacement of the drive arms. In the most preferred configuration, the drive arms include brake pads which, upon radial displacment, contact a brake drum constituting a mechanical ground isolated from the load. Dissipation of the excess force over the limiting value causes a collapse of the drive arms in response to the biasing force and a resumption of the normal operating configuration—thus providing the non-self-energizing feature.

Should the same structure be employed with the input made to the cam side of the coupling, a self-energizing mode is established. This self-energizing feature is one established within the limits of the design and, accordingly, under some situations collapse to the primary transmission configuration upon dissipation of the overload may ensue.

The torque isolation device of the present invention is principally adapted for interposition within the steering system for the nose wheel of aircraft. Accordingly, both input and output will be in angular increments as opposed to full or multiple revolutions. However, upon appropriate design to account for inertia of the components, the torque isolation device of the present invention is equally well adaptable for such multiple-revolution applications.

The foregoing and other advantages will become more apparent, and a fuller appreciation of the structure and mode of operation of the torque isolation device of the present invention will be gained, upon examination of the following detailed description of the invention taken in conjunction with the figures of drawing.

DETAILED DESCRIPTION

Figure 1:
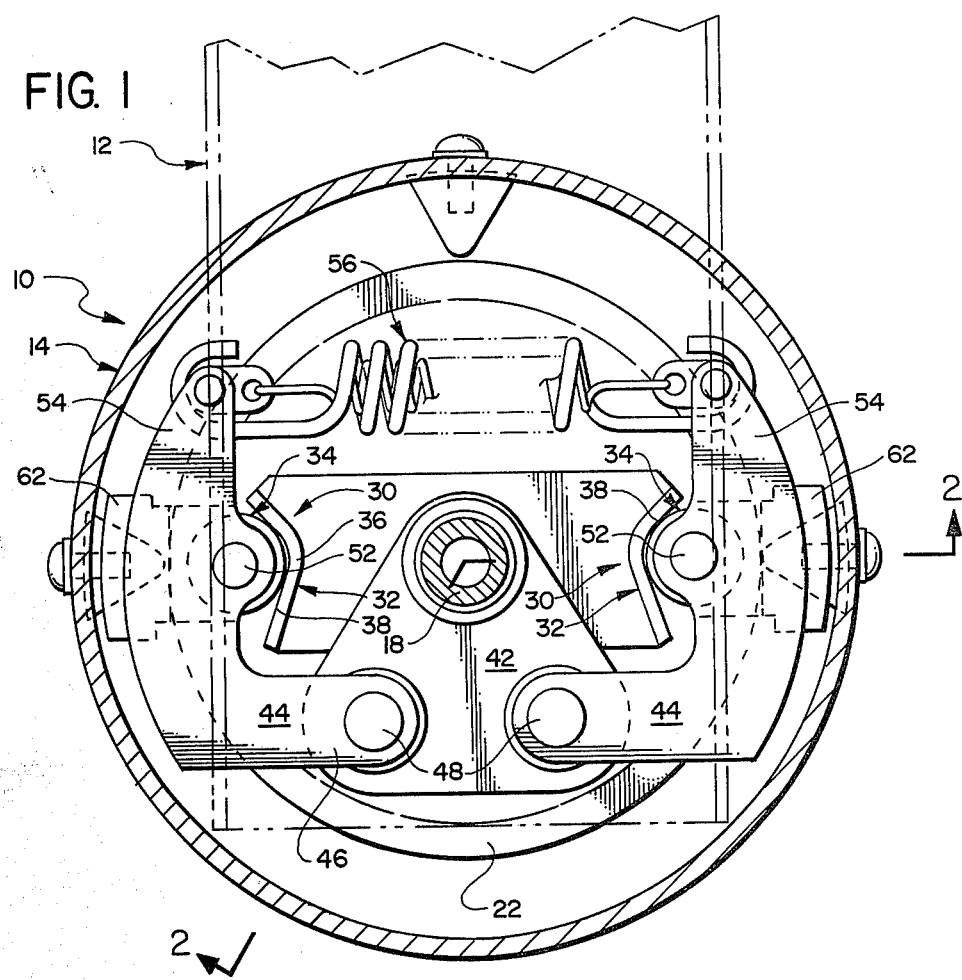
FIG. 1 is a top plan view, partly in phantom, showing the structure of the most preferred embodiment implementing the principles of the present invention, wherein the device is illustrated in the primary transmission configuration; and, FIG. 2 is an angular, cross-sectional view taken substantially along the line 2—2 of FIG. 1, with parts broken away for clarity.

The present invention relates, generally, to torque isolation devices and, more especially, to a non-self-energizing torque isolation device which will limit the force applied to or otherwise experienced by the load, permitting that force to be maintained at or below the limiting value and transferring any force in excess thereof to a mechanical ground having a load-isolated path. The torque isolation device of the present invention may be adapted for use in any application where the aforementioned features are necessary or desirable; albeit, it is particularly well suited for use in aircraft systems such as, e.g., nose wheel steering systems. Accordingly, the present invention will now be described with reference to certain preferred embodiments within the context aforesaid; although those skilled in the art will appreciate that such a description is meant to be exemplary only and should not be deemed limitative of the scope of the invention either in terms of structure or application.

Turning to the figures of drawing, wherein like parts are identified with like reference numerals, a torque limiting device in accordance with the present invention, designated generally as 10, is comprised of an upper housing member 12 and a lower housing member 14 secured by fixture means 16. An input shaft 18 is disposed through a bore 20 in the housings and is journalled for rotation therein. In the embodiment shown, the upper end of the shaft 18 is in effective communication with a power drive or prime mover which supplies a driving torque to the device. An output member 22 is disposed outwardly proximate the lower circumferential periphery of the drive shaft 18 in a manner permitting for relative rotational displacement one with respect to the other, in the sense that input and output are semi-independent across a driving coupling as described below. In the preferred embodiment shown, the output member 22 is a quadrant or pulley havng tapered, inwardly directed grooves 24 for receipt, e.g., of control cables. For purposes of the present description, let it be assumed that the device 10 is incorporated within the steering system for the nose wheel of an aircraft. In such a case, the input shaft 18 will be in operative engagement with a drive source responsive to the pilot's tiller in the cockpit. In turn, cables disposed about the quadrant 22 within the grooves 24 will be in operative engagement with the hydraulic control system manipulating movement of the nose wheel. Within this environment, it is desirable to provide the pilot with a fairly easily moved tiller in order to control the wheel, supply a good mechanical advantage through the system, and ultimately steer a relatively heavy aircraft thus requiring considerable ultimate force application. And, it is equally desirable to employ lightweight materials which, due to the considerable mechanical advantage in the system, cannot be subjected to excessive forces during jamming. These objectives are reconciled in the torque isolation device 10 by employing a radially displaceable driving coupling where forces in excess of the limiting force result in displacement of the coupling to transfer the excess along a load-isolated path while nonetheless transmitting the force up to the limit to the load.

In the illustrated embodiment, the torque isolation device includes an opposed pair of driving couples, designated generally as 30, which collectively comprise the radially displaceable coupling aforesaid. Two such couples 30 are employed in this preferred structural implementation, but that is not a rigid requirement of the invention. The opposed pair of couples is found to be most practical and efficient for the designed utility of the torque isolation device 10 as the input and output motions are normally bi-directional angular increments as opposed to complete or multiple revolutions. The same principles might be used to good advantage in other applications where one driving couple would function quite adequately or where three or more would prove beneficial. In any of these events, however, each driving couple includes a cam/cam follower arrangement where one of the couple elements is associated with the input and the other with the output. Under normal operating conditions the two remain in mated, primary transmission configuration for force transmission through the device; but, once the threshold force value for which the device has been designed is exceeded, the couple is cammed with the follower riding across the camming surface to a secondary transmission configuration routing or bypassing the excess force to a mechanical ground under overload conditions.

Figure 2:
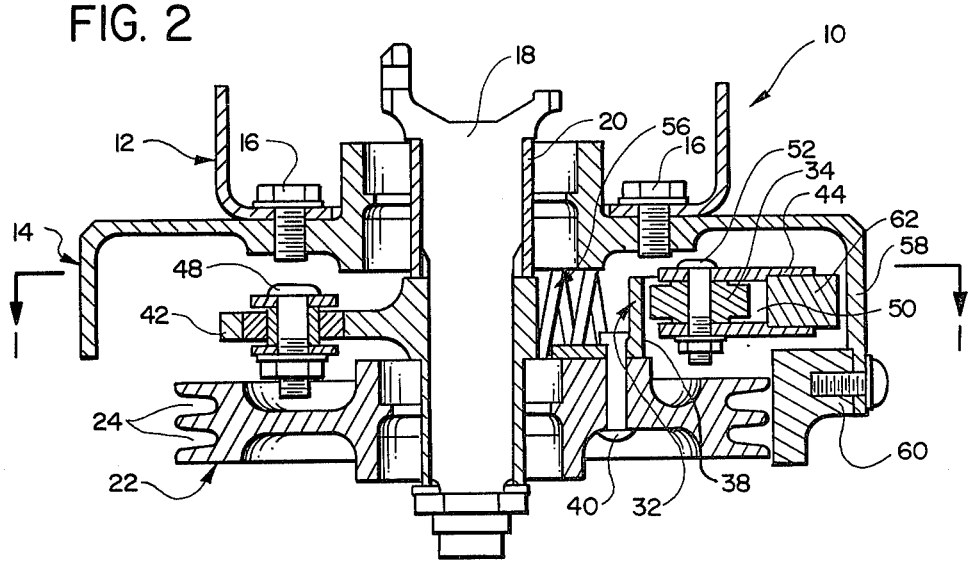

More specifically, and with particular reference to the figures of drawing, each of the couples 30 is shown to be comprised of a generally "V"-shaped cam 32 and a cam follower 34. The cam includes a dwell 36, corresponding to the apex of the "V", which receives the cam follower in the normal or primary transmission configuration of the device. The cam surface 38 then projects radially outward in either direction from the dwell; the shape, pitch, or other surface profile of the cam surface being designed with due regard for the specific limiting force to be transmitted through the device, as indicated in further detail below. As can best be seen with reference to FIG. 2, the cam 32 is secured to the output quadrant 22, in this case by means of a rivet 40. Accordingly, the output and cam are keyed for direct rotation together an force applied to the cam will be transmitted to the output quadrant. The riveting approach is the preferred one within the context of the application for torque isolation device 10 as the output quadrant is desirably a lightweight material while the cam itself will most advantageously be formed from steel for improved wear characteristics. In other environments the cam/output could be made integral or individual parts could be welded or otherwise bonded into a unitary member.

Looking to the input side of the device 10, the cam follower is similarly secured for direct rotation, but now with the input shaft 18. A rigid link 42 is splined to the shaft 18 for rotation therewith, and supports a pair of opposed drive arms 44. Each of the drive arms is shown to be generally "L"-shaped where a first end 46 is pinned to the link 42 by a fixture pin 48 so that the arm is free for radially arcuate displacement about the pivot point. The cam follower 34 associated with each arm is received in a channel or slot 50 therein and is pinned by fixture member 52 for rotation so that is may ride across the camming surface 38. The free ends 54 of the arms 44 are secured by a bridging spring assembly designated generally as 56. Spring assembly 56 biases the drive arms, urging and maintaining them in the primary transmission configuration shown in the figures of drawing. The biasing spring together with the geometry of the cam surface, establishes the threshold torque value which can be transmitted through the device in this primary mode. On experiencing an excess torque, the biasing force will be overcome and the drive arms 44 will be cammed radially outward about the pivot point 48 into an overload configuration.

The lower housing 14 includes a downwardly depending skirt 58 and guard 60 circumferentially enveloping the drive components. The portion of skirt 58 above the guard 60 outwardly proximate the drive arms 44 also serves as a mechanical ground akin to a brake drum against which the drive arms will bear in the overload position; in the sense that it is rigidly affixed to the drive side of the system through the upper housing 12 and is otherwise independent from the load side of the device. Each of the drive arms includes a brake pad 62 received in slot 50; projecting radially outward therefrom for engagement with the skirt 58 under overload circumstances.

In operation, the torque isolation device of the present invention simply yet efficiently transfers overload torque to the mechanical ground 58, away from the load while continuing to transmit the force at or below the established threshold. That threshold is governed by the biasing force holding the drive arms in the primary transmission position with the cam follower nested in the cam dwell, along with the geometry of the cam surface itself. Torque applied to the input shaft 18 will cause the link 42 to move along with the slaved drive arms 44. That force is coupled across the cam follower to the cam 32 and, accordingly, to the output quadrant 22 to which it is itself rigidly affixed. Consequently, an incremental angular input on drive shaft 18 results in an equal incremental angular output on quadrant 22. In the event of an overload or jamming situation effectively freezing the output quadrant, force in excess of that which is safe for the load to experience is routed to the mechanical ground 58 which constitutes an independent load isolation path. More specifically, as the input shaft continues to have a force applied to it, and once that force exceeds the limiting force, it will be transmitted through the drive arms 44; but now the cam 32 is stationary due to the jamming of the output quadrant 22. In the event, the additional force causes the cam followers to ride across the cam surface 38 against the biasing force provided by spring assembly 56. Concomitantly, the drive arms 44 pivot radially outward along an arcuate path about the pivot point at pin 48. This brings the brake pad 62 into contact with skirt 58 and the force in excess of the safe force is transmitted to this mechanical ground. If the downstream jamming dissipates, the quadrant will be freed for rotation and the device will collapse to its normal or primary transmission configuration shown in the figures of drawing. It should be appreciated that the time response characteristics of the instant device for the transition from the normal to the overload configuration upon the sensing of an overload input may be tailored by appropriately sizing the gap between the brake pad 62 and skirt 58. This may be achieved in any number of ways, such as simply sizing the pad to provide a desired temporal response, and adds to the versatility of the device in both its range of applications and adaptability within a specific application.

Taking a situation within the design objective of the instant invention, let it be assumed that the safe force for steerage of the nose wheel of an aircraft is 600 pounds. Let it further be assumed that, due to the considerable mechanical advantage built into the system, the drive is capable of developing 1000 pounds of force which, if applied to the nose wheel steering assembly, would damage it. Let is additionally be assumed that the nose wheel of the aircraft is frozen to the ground in a patch of ice, effectively immobilized against movement. As the pilot manipulates the tiller and the force approaches 600 pounds, that will be transmitted through the isolation device 10. Should be wheel break free as the force increases, normal operation is maintained. However, should the wheel require greater than 600 pounds force to the steering assembly to break from the restraining ice, the continued application of force in excess of the design limit to, e.g., 1000 pounds, will cause radial displacement of the drive arm 44 so that the brake pads 62 engage the mechanical ground 58 isolating that additional 400 pounds while the 600 pound safe load remains applied to the assembly. Should the ice now melt while this force remains applied, the wheel will respond to the primary transmission of the 600 pound force. This also frees the output quadrant 22 and the drive arms collapse in response to the biasing force of the spring assembly 56 and resume the normal operating configuration. This is a significant advantage over conceptually similar torque isolation devices as the structure of the present invention allows for automatic rearming once the cause of the overload disappears; eliminating the need either for a manual reset or for requirements that the input be backed off to allow reestablishment of the primary configuration.

It will be appreciated by those skilled in the art that the device of the present invention may be reversed in terms of input and output and still achieve good torque isolation. The couples 30 comprising the device will operate conceptually the same whether the force is applied to the cam follower and the output taken from the cam ov vice versa. Consequently, the input could be made through the quadrant 22 or a shaft in lieu thereof otherwise secured directly to the cam 32. This input will be transmitted across the couple to the cam follower, resulting in a drive on the arms 44. In turn this will be transmitted through the link 42 to the shaft 18 or other output element. When excess force is applied through the cam 32 as the result of a jamming of the output at 18, the continued rotation of the input 22 will force the movement of the drive arms 44 to the overload configuration where the brake pad 62 engages the mechanical ground 58. Thus, the operation is consistent with that noted above. In many circumstances, the same self-collapsing feature (i.e., non-self-energizing feature) will be achieved; albeit, it is anticipated that conditions approaching the design limitation of the device may yield a self-energizing operation when the input and output is reversed in this fashion.

Those skilled in the art will further appreciate that the principles set forth above can be implemented in devices operating under complete or multiple revolution situations as opposed to the incremential angular operation discussed with reference to steerage systems. Of course, balance to account for inertia of the components will be required, but those familiar with this art will have no difficulty achieving that aim. Accordingly, apart from the specific intended application wihtin a steering system, the torque isolation device of the present invention might equally well be employed in, e.g., a metal working machine. Should the load jam the tool or should there by any other overload condition, freezing the output will result in a coupling of the input for forces in excess of the limiting value to a load-isolated path thereby protecting the work.

As can readily be seen from the foregoing, the torque isolation device of the present invention enjoys the highly desirable attribute of simplicity in design while nonetheless providing an extremely reliable, efficient, and widely adaptable apparatus which will protect loads from forces in excess of an established safe one. With those thoughts in mind, the invention has been described with reference to certain preferred embodiments within selected applications for utility; but those skilled in the art will appreciate that various substitutions, modifications, changes and omissions may be made without departing from the spirit thereof. Hence, it is intended that the scope of the present invention be limited solely by that of the claims granted herein.

I claim:

1. A torque isolation device for a force-sensitive load having a safe force limit to be imposed thereon, configured to transmit an upstream rotational force within said limit to said load and transmit any force in excess thereof to a load-isolated path, comprising:
   a. input and output shaft means disposed for semi-independent relative rotational displacement with respect to one another;
   b. cam means in operative communication with one of said shaft means for driving rotation therewith, said cam means including a dwell and bidirectional, outwardly oriented camming surfaces bounding same;
   c. extensible drive arm means in operative communication with the other of said shaft means and securing cam follower means in proximate engagement with said cam means to define a drive coupling between said shaft means; and,
   d. biasing means for maintaining a primary transmission configuration with said cam follower means disposed within said dwell over a range of input forces below a limit force and for permitting extension of said drive arm means to an overload position upon application of force in excess of said limit.

2. The torque isolation device of claim 1, wherein said cam means is disposed on said input shaft means.

3. The torque isolation device of claim 1, wherein said cam means is disposed on said output shaft means.

4. A torque isolation device for a force-sensitive load having a safe force limit to be imposed thereon, configured to transmit upstream rotational force within said limit to said load and transmit any force in excess thereof to a load-isolated path, comprising:

a. input and output shaft means disposed for semi-independent relative rotational displacement with respect to one another;
b. cam means in operative communications with one of said shaft means for driving rotation therewith, said cam means including a dwell and bidirectional, outwardly oriented camming surfaces bounding same;
c. extensible drive arm means in operative communication with the other of said shaft means and securing cam follower means in proximate engagement with said cam means to define a drive coupling between said shaft means;
d. biasing means for maintaining a primary transmission configuration with said cam follower means disposed within said dwell over a range of input forces below a limit force and for permitting extension of said drive arm means to an overload position upon application of force in excess of said limit; and,
e. mechanical ground means for engagement with said drive arm means when in said overload position.

5. The torque isolation device of claim 4, wherein said extensible drive arm means includes first and second opposed drive arm members pivotally secured at a fixed end to a link disposed for rotation with said input shaft and further wherein said biasing means bridges the free distal ends thereof.

6. The torque isolation device of claim 5, wherein said drive arm members are generally "L"-shaped members having the proximal end of a first leg pivotally secured to said link.

7. The torque isolation device of claim 6, wherein the second leg of each of said drive arm members includes a braking face.

8. The torque isolation device of claim 7, wherein said braking face supports a brake pad for engagement with said mechanical ground.

9. The torque isolation device of claims 4, 5, 6, 7 or 8 wherein said cam means is secured to said output shaft and includes an outwardly directed, generally "V"-shaped cam surface wherein the apex defines said dwell.

10. A torque isolation device for a force-sensitive load having a safe force limit to be imposed thereon, configured to transmit an upstream rotational force within said limit to said load and transmit any force in excess thereof to a load-isolated path, including:

a. a housing having a circumferential skirt comprising a mechanical ground;
b. an input member and an output member journalled for semi-independent rotation in said housing;
c. a link secured to said input member for slaved rotation therewith;
d. first and second drive arm members, each of said drive arms being pivotally joined at one end to said link and having a free end radially displaceable along an arcuate path;
e. first and second cam members disposed in opposed relationship in engagement with said output member for slaved rotation therewith, each of said cam members including a generally "V"-shaped cam surface open in a radially outward direction wherein the apex defines a cam dwell;
f. first and second cam followers, one of each secured to a respective one of said drive arm members, for drive engagement with a respective one of said cam members;
g. a biasing spring assembly bridging the free ends of said drive arm members for maintaining said cam followers in driving contact with said dwell for force inputs below a limiting value and permitting radially outward camming of said drive arms for force inputs in excess of said limiting value to an overload position; and,
h. brake pad means borne upon each of said drive arm members for contacting said circumferential skirt when said drive arms are in said overload position to transfer force in excess of said limiting value to mechanical ground;

wherein the application of force in excess of said limiting value causes extension of said drive arms from a primary transmission position with said cam followers in driving contact with said cams to said overload position providing a first load path through said output member for force at said limiting value and a second load path through said skirt isolated from said first load path for force in excess thereof, and further wherein a reduction of said force to or below said limiting value allows automatic return of said drive arms to said primary transmission position.

* * * * *